United States Patent
Cheng et al.

(10) Patent No.: US 12,321,933 B2
(45) Date of Patent: Jun. 3, 2025

(54) SYSTEMS AND METHODS FOR GENERATING AGGREGATE RECORDS

(71) Applicant: Capital One Services, LLC, McLean, VA (US)

(72) Inventors: Lin Ni Lisa Cheng, New York, NY (US); John Fields, Henrico, VA (US); Wade Rance, Washington, DC (US); Alexis Howard, Cobbs Creek, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 126 days.

(21) Appl. No.: 17/884,527

(22) Filed: Aug. 9, 2022

(65) Prior Publication Data

US 2024/0054488 A1  Feb. 15, 2024

(51) Int. Cl.
*G06Q 20/38* (2012.01)
*G06Q 20/40* (2012.01)

(52) U.S. Cl.
CPC ....... *G06Q 20/389* (2013.01); *G06Q 20/4014* (2013.01)

(58) Field of Classification Search
None
See application file for complete search history.

(56) References Cited

U.S. PATENT DOCUMENTS

| | | | |
|---|---|---|---|
| 10,554,406 B1 * | 2/2020 | Tang | H04L 9/3239 |
| 11,132,460 B2 | 9/2021 | Chen | |
| 2019/0318031 A1 * | 10/2019 | Sim | G06F 16/287 |
| 2020/0065397 A1 * | 2/2020 | Goenka | G06F 16/1834 |
| 2020/0175610 A1 * | 6/2020 | Pikle | G06N 20/00 |
| 2021/0176052 A1 | 6/2021 | Chen et al. | |
| 2022/0326994 A1 * | 10/2022 | Mueller | G06F 21/6218 |
| 2024/0046318 A1 * | 2/2024 | Muriqi | G06Q 20/389 |

FOREIGN PATENT DOCUMENTS

WO   WO-2021026611 A1 *  2/2021  ......... G06F 21/6245

* cited by examiner

*Primary Examiner* — Peter D Nolan
*Assistant Examiner* — Matthew Cobb
(74) *Attorney, Agent, or Firm* — TROUTMAN PEPPER LOCKE LLP; Christopher J. Forstner; John A. Morrissett (57) ABSTRACT

Disclosed embodiments may include a system for generating aggregate records. The system may retrieve data corresponding to a first user. The system may receive, from the first user, first sharing preference(s) associated with a second user. The system may extract first data subset(s) from the data based on the first sharing preference(s). The system may generate block(s) of a blockchain ledger. The system may append the first data subset(s) to at least a first block of the block(s) of the blockchain ledger. The system may provide the second user with access to the first data subset(s) on the at least first block.

20 Claims, 4 Drawing Sheets

SYSTEMS AND METHODS FOR GENERATING AGGREGATE RECORDS

The disclosed technology relates to systems and methods for generating aggregate records. Specifically, this disclosed technology relates to providing organizations with selective access to other organizations' records via a blockchain ledger.

BACKGROUND

Organizations, such as small and medium-sized businesses, have a need to share business and financial information with other organizations. For example, an organization may need to share its credit worthiness and standing with another organization for entering into a partnership, or to a lender for taking out a loan or line of credit.

Accordingly, there is a need for improved systems and methods for generating aggregate records. Embodiments of the present disclosure are directed to this and other considerations.

SUMMARY

Disclosed embodiments may include a system for generating aggregate records. The system may include one or more processors, and memory in communication with the one or more processors and storing instructions that, when executed by the one or more processors, are configured to cause the system to generate aggregate records. The system may retrieve data (e.g., financial information) corresponding to a first user (e.g., an organization). The system may receive, from the first user, one or more first sharing preferences associated with a second user. Based on the one or more first sharing preferences, the system may extract one or more first data subsets from the data. The system may generate one or more blocks of a blockchain ledger. The system may append the one or more first data subsets to at least a first block of the one or more blocks of the blockchain ledger. The system may provide the second user with access to the one or more first data subsets on the at least first block. The system may retrieve one or more updates corresponding to the data. Based on the one or more first sharing preferences, the system may extract one or more second data subsets from the one or more updates. The system may append the one or more second data subsets to at least a second block of the one or more blocks of the blockchain ledger. The system may provide the second user with access to the one or more second data subsets on the at least second block.

Disclosed embodiments may include a system for generating aggregate records. The system may include one or more processors, and memory in communication with the one or more processors and storing instructions that, when executed by the one or more processors, are configured to cause the system to generate aggregate records. The system may retrieve one or more metadata snapshots corresponding to a first organization. The system may receive, from the first organization, one or more first sharing preferences associated with a second organization. Based on the one or more first sharing preferences, the system may extract one or more first subsets of metadata from the one or more metadata snapshots. The system may generate one or more blocks of a blockchain ledger. The system may append the one or more first subsets of metadata to at least a first block of the one or more blocks of the blockchain ledger. The system may provide the second organization with access to the one or more first subsets of metadata on the at least first block.

Disclosed embodiments may include a system for generating aggregate records. The system may include one or more processors, and memory in communication with the one or more processors and storing instructions that, when executed by the one or more processors, are configured to cause the system to generate aggregate records. The system may retrieve one or more metadata snapshots corresponding to a first organization. The system may receive, from the first organization, one or more sharing preferences associated with a second organization. Based on the one or more sharing preferences, the system may extract one or more first subsets of metadata from the one or more metadata snapshots. The system may generate one or more blocks of a blockchain ledger. The system may append the one or more first subsets of metadata to at least a first block of the one or more blocks of the blockchain ledger. The system may provide the second organization with access to the one or more first subsets of metadata on the at least first block. The system may retrieve one or more updates corresponding to the one or more first subsets of metadata. The system may append the one or more updates to at least a second block of the one or more blocks of the blockchain ledger. The system may provide the second organization with access to the one or more updates on the at least second block.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Traditional systems and methods for generating aggregate records, e.g., QuickBooks®, are typically modifiable by users, and thus unreliable in terms of their accuracy, particularly over time. As such, organizations may not be fully or accurately informed of other organizations' financial portfolios when making business decisions, e.g., lending or crediting.

Accordingly, examples of the present disclosure relate to systems and methods for generating aggregate records. More particularly, the disclosed technology relates to providing organizations with access to other organizations' records through the use of blockchain. Organizations' records may be appended to existing block(s) of a blockchain, thereby adding to a blockchain ledger, or appended to a newly generated block. The systems and methods described herein may improve, in some instances, the accuracy of data and record sharing by extracting data (e.g., metadata snapshots) of a first organization, and appending a subset of that data to a block of a blockchain to provide a second organization with access based on the first organization's sharing preferences. The present disclosure details retrieving data corresponding to a first organization, extracting subsets of the data based on the first organization's preferences for sharing data with a second organization, generating blocks of a blockchain ledger, appending the extracted subsets to the generated blocks, and providing the second organization with access to the subsets via the generated blocks. This, in some examples, may involve using one or more processors to dynamically monitor the data for any modifications or updates such that the system may continue to provide the second organization with data access as the first organization's records change over time. Using a computer system configured in this way may allow the system to increase the efficiency and accuracy of record sharing across organizations. This is a clear advantage and improvement over prior technologies that provide modifiable data records because these types of technologies may not provide businesses, organizations, and other users with fully accurate or reliable information. The present disclosure solves this problem by appending extracted data to blocks of a blockchain ledger that thereafter cannot be modified. Furthermore, examples of the present disclosure may also improve the speed with which computers can retrieve and extract data. Overall, the systems and methods disclosed have significant practical applications in the record sharing field because of the noteworthy improvements to the reliability of the shared records, which are important to solving present problems with this technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
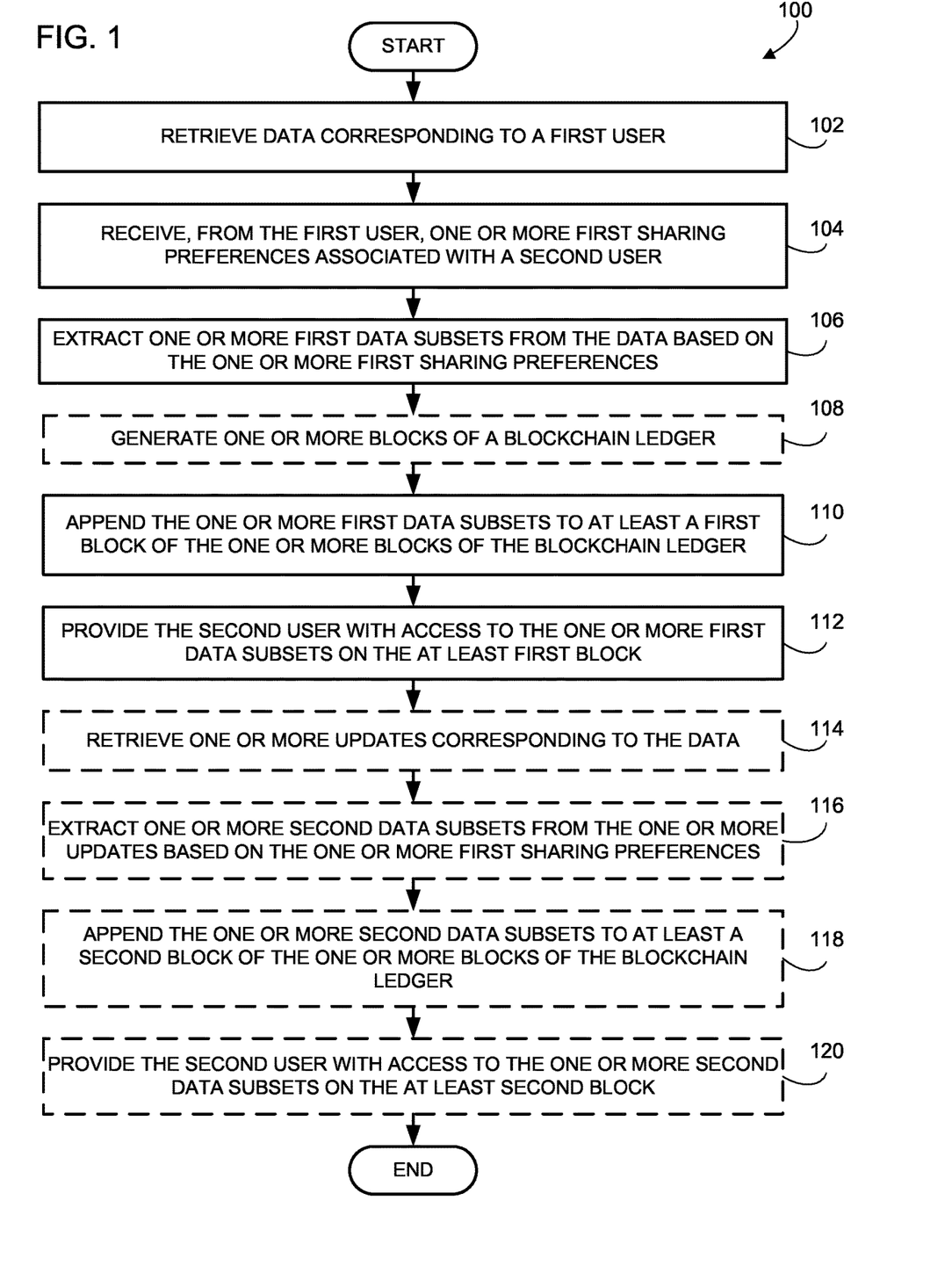
FIG. 1 is a flow diagram illustrating an exemplary method for generating aggregate records in accordance with certain embodiments of the disclosed technology.

FIG. 1 is a flow diagram illustrating an exemplary method 100 for generating aggregate records, in accordance with certain embodiments of the disclosed technology. The steps of method 100 may be performed by one or more components of the system 400 (e.g., extraction system 320 or web server 410 of data aggregation system 408, user device 402, and/or third-party server 404), as described in more detail with respect to FIGS. 3 and 4.

In block 102, the extraction system 320 may retrieve data corresponding to a first user (e.g., an organization, business, etc.). The data may include metadata snapshots of one or more types of financial information, such as credit limits, credit scores, payment schedules, debts, transactions, late payments, on-time payments, vendor relationships, and the like. The extraction system 320 may retrieve the data from a variety of systems or programs, such as a typical Enterprise Resource Planning (ERP) System owned and/or operated by a third party (e.g., via third-party server 404) or an organization affiliated with data aggregation system 408, or an application programming interface (API) pointing to data aggregation system 408 and acting as a temporary or intermittent staging setting.

In block 104, the extraction system 320 may receive, from the first user, one or more first sharing preferences associated with a second user (e.g., an organization, business, etc.). That is, the first user may in some way inform the extraction system 320 of the types of information, generally and/or specifically, the first user would like to share with the second user. The extraction system 320 may receive the first sharing preference(s), for example, by the first user entering its preferences via a graphical user interface (GUI) of user device 402, e.g., through an application affiliated with aggregation system 408. Extraction system 320 may use the first sharing preferences to determine and/or predict the types of information the first user would like to share with the second user, as further described below.

In block 106, the extraction system 320 may extract one or more first data subsets from the data based on the one or more first sharing preferences. That is, based on the types of information the first user previously indicated it would like to share with the second user, the extraction system 320 may sort through the retrieved data to select and extract certain subsets of the data corresponding to the first sharing preferences. In some embodiments, the first sharing preference(s) may clearly indicate a specific subset of data to be shared with the second user. In such case, the extraction system 320 may strictly adhere to that sharing preference(s) and extract that specific subset(s) of data.

In some embodiments, the extraction system 320 may determine that none of the received first sharing preference(s) correspond to one or more types or subsets of data contained within the retrieved data. In such case, the extraction system 320 may use the first sharing preference(s) to predict which subsets of data to extract from the retrieved data for purposes of sharing with the second user. This prediction may be based on grouping of like types of data or information, and/or the first and second users' type or purpose of business. For example, the extraction system 320 may utilize a machine learning model (MLM) that has been trained to associate certain data types with certain businesses and/or business purposes, such that the MLM may receive new types of data and determine whether they might be closely associated with certain businesses and/or business purposes. In some embodiments, the MLM may include a multi-model based on the specific use case.

In optional block 108, the extraction system 320 may generate one or more blocks, such that the one or more blocks may be published to a blockchain and data appended to the blocks, as further discussed below. In some embodiments, for example when the source of data is unknown, the system may be configured to generate one or more new blocks and append the data to the one or more new blocks. In some embodiments, for example when the source of data is known, the system may be configured to append the data to existing blocks of a blockchain, as part of the blockchain ledger, rather than generate new blocks.

In block 110, the extraction system 320 may append the one or more first data subsets to at least a first block of the one or more blocks of the blockchain ledger. In some embodiments, the first block of the one or more blocks may include a unique location on the blockchain ledger.

Along with appending the first data subset(s) to the first block of the blockchain ledger, the extraction system 320 may also generate (e.g., via SHA-256 hash algorithm) a cryptographic hash, including a form of digital identification or signature associated with the first user and first data subset(s). The cryptographic hash may be appended to the next block, or the block directly succeeding the first block (e.g., the hash of the "N−1" block is included in the "N" block). The cryptographic hash verifies the accuracy of the first data subset(s) such that other parties who later view the first data subset(s) (e.g., a second user) may recognize whether they are accurate and/or whether they have been tampered with. For example, should a user recognize that a hash of a previous "N−1" block does not match the hash stored in the current "N" block, the user may recognize that the data has been tampered with in some fashion.

A hash is a uniquely identifying cryptographic 'fingerprint' of a specified amount of data. The same hash will always result from the same data, but even the slightest or bitwise change to the data will significantly change the value of the hash, and thus change the alignment or correspondence between all hashes in that respective chain within the blockchain ledger. The cryptographic hash corresponding to the first user and first data subset(s) in a first block may be appended to the next block to help ensure accurate chain of ownership. A recipient, e.g., a second user or organization, may verify the hash in order to verify the chain of ownership.

In order to verify the chain of ownership without a trusted intermediary, transactions, e.g., providing access to data by one user to another, may be publicly broadcast, and a system of verification employed for participants (e.g., organizations) to agree on a single history of the distributed ledger. That is, the recipient of a data subset(s) requires proof that, at the time of the data sharing, all nodes (e.g., entity nodes 120) having received the corresponding transaction receipt have verified the chain of ownership information contained within the cryptographic hash.

Figure 4:
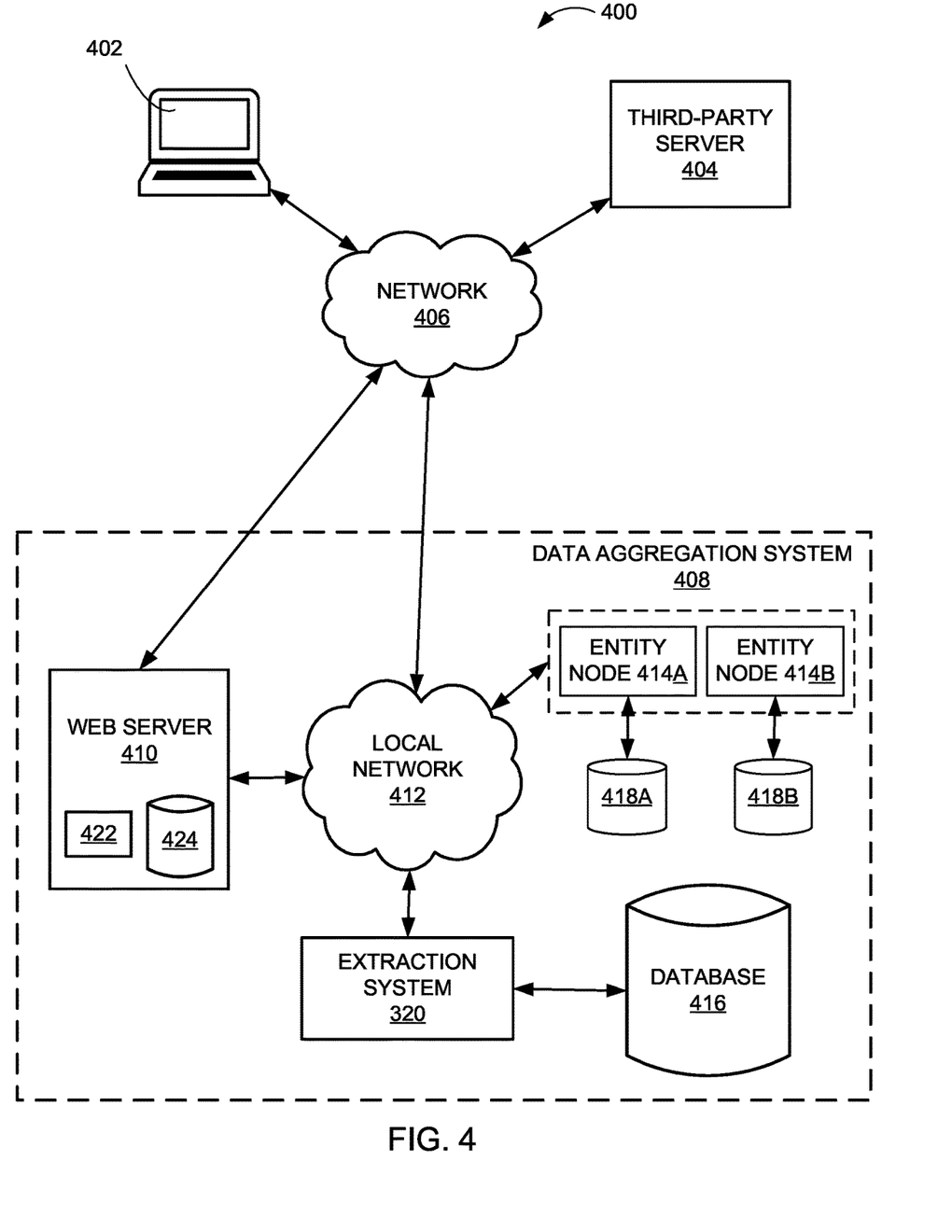
FIG. 4 is block diagram of an example system that may be used for generating aggregate records, according to an example implementation of the disclosed technology.

In exemplary embodiments of the present disclosure, such a blockchain ledger is maintained by the system of communicating nodes connected by the network 106. Transaction may be validated by entity node 414A, added to that node's copy of the ledger, and then broadcast to one or more entity nodes 414B, 414C, etc. The receiving entity nodes 414 may then store a copy of the blockchain ledger. Each new block incorporates a group of verified transactions, and is added to the blockchain, which is published to a plurality of nodes.

In block 112, the extraction system 320 may provide the second user with access to the one or more first data subsets on the blockchain. In some embodiments, providing the second user with access may include generating and storing some type of unique identifier, such as a private key or an access code, e.g., a limited-use or one-time use key or code. The system may then transmit the generated unique identifier to the second user (e.g., via an email, push notification, mobile application, etc.). When the second user attempts to access and/or view the first data subsets, the second user may provide the unique identifier to the extraction system 320 (or other component of data aggregation system 408) such that the extraction system 320 may compare the second user's provided unique identifier with the corresponding stored identifier to determine whether the provided and stored identifiers match. The second user may provide the unique identifier to the extraction system 320, e.g., by clicking a link in a provided email or text message, entering the unique identifier in a prompt generated within a mobile application, etc.

In some embodiments, an initially generated and stored unique identifier, associated with the sharing of data from a first user to a second user, may be used each time the second user attempts to access the first data subsets or any additional or updated data subsets associated with the first data subsets (e.g., second data subsets), as further discussed below. In some embodiments, extraction system 320 may be configured to generate and store a new unique identifier to provide to the second user each time a new or updated data subset(s) associated with the first user is appended to a block of the blockchain ledger.

In block 114, the extraction system 320 may optionally retrieve one or more updates corresponding to the data. That is, data, e.g., financial information, corresponding to the first user may change over time. As such, the extraction system 320 may be configured to retrieve, e.g., periodically or at some predefined frequency, any updates to the initially retrieved data corresponding to the first user. Extraction system 320 may retrieve the update(s) using the same or a similar method as that discussed above with respect to block 102.

In block 116, the extraction system 320 may optionally extract one or more second data subsets from the one or more updates based on the one or more first sharing preferences. This step may be the same as or similar to that discussed above with respect to block 106. In some embodiments, the extraction system 320 may be configured to receive one or more second sharing preferences associated with the similar user in the same or a similar fashion as receiving the first sharing preference(s) in block 104. In such embodiments, extracting the second data subset(s) may be further based on the second sharing preference(s). That is, the second sharing preference(s) may specify additional types of information the first user would like to share with the second user, and/or types of information the first user was previously open to sharing with the second user, but would now rather not share. In this case, while the first data subsets already appended to the blockchain (block 110) cannot be modified, the extraction system 320 may modify which types of data it extracts as the second data subset(s) for purposes of sharing with the second user.

In block 118, the extraction system 320 may optionally append the one or more second data subsets to the at least second block of the one or more blocks of the blockchain ledger. Additionally, the extraction system 320 may generate and append to the second block a cryptographic hash associated with the first user and the second data subsets. This step may be the same as or similar to that discussed above with respect to block 110. In some embodiments, the second block of the one or more blocks may include a unique location on the blockchain ledger. The unique location of the second block may be different from the unique location of the first block, as discussed above with respect to block 110.

In block 120, the extraction system 320 may optionally provide the second user with access to the one or more second data subsets on the blockchain. This step may be the same as or similar to that discussed above with respect to block 110.

In some embodiments, the extraction system 320 may be configured to generate a link configured to connect the first and second data subset(s) such that when the second user accesses or views the first data subset(s), the second user may also access the link that directs the second user from the older records included in the first data subset(s) to any newer and/or updated records included in the second data subset(s). The extraction system 320 may append the generated link to the first block of the blockchain ledger, as discussed above, and provide the second user with access to the link, for example using similar methods as described in blocks 112 and 120.

Figure 2:
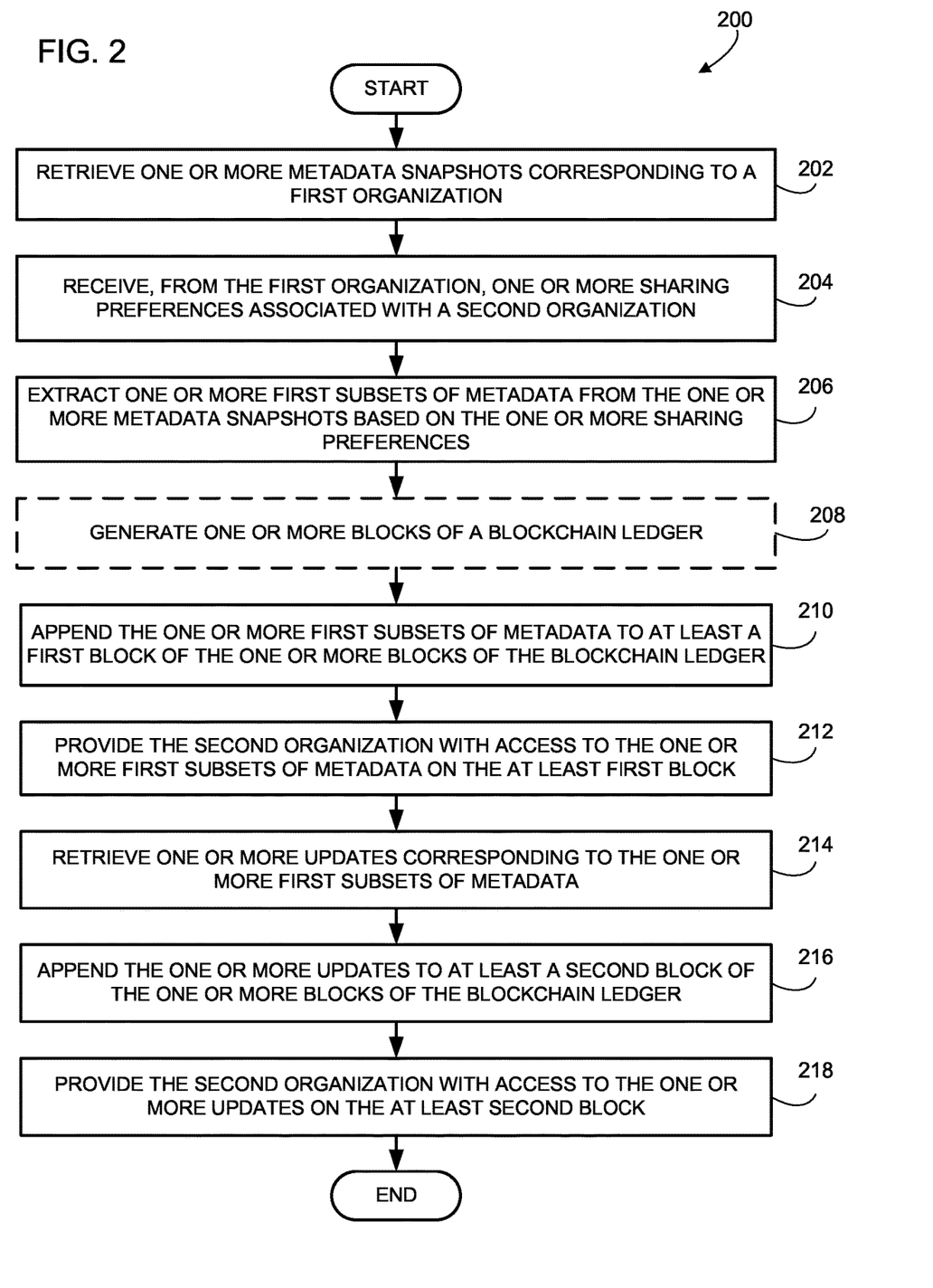
FIG. 2 is a flow diagram illustrating an exemplary method for generating aggregate records in accordance with certain embodiments of the disclosed technology.

FIG. 2 is a flow diagram illustrating an exemplary method 200 for generating aggregate records, in accordance with certain embodiments of the disclosed technology. The steps of method 200 may be performed by one or more components of the system 400 (e.g., extraction system 320 or web server 410 of data aggregation system 408, user device 402, and/or third-party server 404), as described in more detail with respect to FIGS. 3 and 4.

Method 200 of FIG. 2 is similar to method 100 of FIG. 1, except that method 200 may include blocks 214 and 216. The descriptions of blocks 202, 204, 206, 208, 210, 212, and 218 of method 200 may be the same as or similar to the respective descriptions of blocks 102, 104, 106, 108, 110, 112, and 120 of method 100, and as such are not repeated herein for brevity. However, blocks 214 and 216 are described below.

In block 214, the extraction system 320 may retrieve one or more updates corresponding to the one or more first subsets of metadata. That is, rather than retrieve updates to the initial data (e.g., metadata snapshots) corresponding to the first user (e.g., organization), and extract data subset(s) based on the first and/or second sharing preference(s), as described above with respect to method 100 of FIG. 1, extraction system 320 may be configured to retrieve updates to only those first subsets of metadata that have already been shared with the second user based on the first user's provided first sharing preference(s).

In block 216, the extraction system 320 may append the one or more updates to the at least second block of the one or more blocks of the blockchain ledger. That is, as extraction system 320 retrieved updates to only those first subsets of metadata already shared with the second user, as discussed above, the extraction system 320 may not need to conduct further extraction of the retrieved updates. As such, the extraction system can simply append all retrieved updates to the second block, which may be the same as or similar to that discussed above with respect to block 110 (and block 118) of FIG. 1.

Figure 3:
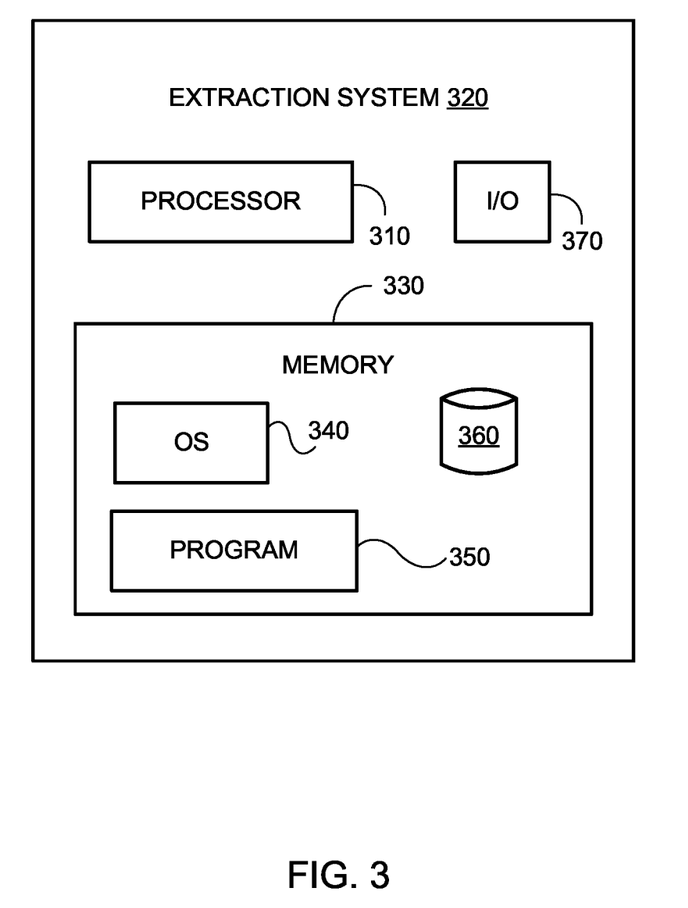
FIG. 3 is block diagram of an example extraction system used for generating aggregate records, according to an example implementation of the disclosed technology.

FIG. 3 is a block diagram of an example extraction system 320 used to extract subsets of data from retrieved data based on an organization's sharing preferences, according to an example implementation of the disclosed technology. According to some embodiments, the user device 402, third-party server 404, and web server 410, as depicted in FIG. 4 and described below, may have a structure and components that are similar to those described with respect to extraction system 320 shown in FIG. 3. As shown, the extraction system 320 may include one or more processors 310, an input/output (I/O) device 370, a memory 330 containing an operating system (OS) 340, a program 350, and a database 360. In certain example implementations, the extraction system 320 may be a single server or may be configured as a distributed computer system including multiple servers or computers that interoperate to perform one or more of the processes and functionalities associated with the disclosed embodiments. In some embodiments extraction system 320 may be one or more servers from a serverless or scaling server system. In some embodiments, the extraction system 320 may further include a peripheral interface, a transceiver, a mobile network interface in communication with the processor 310, a bus configured to facilitate communication between the various components of the extraction system 320, and a power source configured to power one or more components of the extraction system 320.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), NFC, Bluetooth™ low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 310 to communicate with other devices via wired or wireless networks, whether local or wide area, private or public, as known in the art. A power source may be configured to provide an appropriate alternating current (AC) or direct current (DC) to power components.

The processor 310 may include one or more of a microprocessor, microcontroller, digital signal processor, co-processor or the like or combinations thereof capable of executing stored instructions and operating upon stored data. The memory 330 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 330.

The processor 310 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 310 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 310 may be a single core processor that is configured with virtual processing technologies. In certain embodiments, the processor 310 may use logical processors to simultaneously execute and control multiple processes. The processor 310 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the extraction system 320 may include one or more storage devices configured to store information used by the processor 310 (or other components) to perform certain functions related to the disclosed embodiments. In one example, the extraction system 320 may include the memory 330 that includes instructions to enable the processor 310 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The extraction system 320 may include a memory 330 that includes instructions that, when executed by the processor 310, perform one or more processes consistent with the functionalities disclosed herein. Methods, systems, and articles of manufacture consistent with disclosed embodiments are not limited to separate programs or computers configured to perform dedicated tasks. For example, the extraction system 320 may include the memory 330 that may include one or more programs 350 to perform one or more functions of the disclosed embodiments. For example, in some embodiments, the extraction system 320 may additionally manage dialogue and/or other interactions with the customer via a program 350.

The processor 310 may execute one or more programs 350 located remotely from the extraction system 320. For example, the extraction system 320 may access one or more remote programs that, when executed, perform functions related to disclosed embodiments.

The memory 330 may include one or more memory devices that store data and instructions used to perform one or more features of the disclosed embodiments. The memory 330 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 330 may include software components that, when executed by the processor 310, perform one or more processes consistent with the disclosed embodiments. In some embodiments, the memory 330 may include an extraction system database 360 for storing related data to enable the extraction system 320 to perform one or more of the processes and functionalities associated with the disclosed embodiments.

The extraction system database 360 may include stored data relating to status data (e.g., average session duration data, location data, idle time between sessions, and/or average idle time between sessions) and historical status data. According to some embodiments, the functions provided by the extraction system database 360 may also be provided by a database that is external to the extraction system 320, such as the database 416 as shown in FIG. 4.

The extraction system 320 may also be communicatively connected to one or more memory devices (e.g., databases) locally or through a network. The remote memory devices may be configured to store information and may be accessed and/or managed by the extraction system 320. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The extraction system 320 may also include one or more I/O devices 370 that may comprise one or more interfaces for receiving signals or input from devices and providing signals or output to one or more devices that allow data to be received and/or transmitted by the extraction system 320. For example, the extraction system 320 may include interface components, which may provide interfaces to one or more input devices, such as one or more keyboards, mouse devices, touch screens, track pads, trackballs, scroll wheels, digital cameras, microphones, sensors, and the like, that enable the extraction system 320 to receive data from a user (such as, for example, via the user device 402).

In examples of the disclosed technology, the extraction system 320 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

The extraction system 320 may include programs configured to retrieve, store, and/or analyze properties of data models and datasets. For example, extraction system 320 may include or be configured to implement one or more data-profiling models. A data-profiling model may include machine learning models and statistical models to determine the data schema and/or a statistical profile of a dataset (e.g., to profile a dataset), consistent with disclosed embodiments. A data-profiling model may include an RNN model, a CNN model, or other machine-learning model.

The extraction system 320 may include algorithms to determine a data type, key-value pairs, row-column data structure, statistical distributions of information such as keys or values, or other property of a data schema may be configured to return a statistical profile of a dataset (e.g., using a data-profiling model). The extraction system 320 may be configured to implement univariate and multivariate statistical methods. The extraction system 320 may include a regression model, a Bayesian model, a statistical model, a linear discriminant analysis model, or other classification model configured to determine one or more descriptive metrics of a dataset. For example, extraction system 320 may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

The extraction system 320 may be configured to return a statistical profile of a dataset (e.g., using a data-profiling model or other model). A statistical profile may include a plurality of descriptive metrics. For example, the statistical profile may include an average, a mean, a standard deviation, a range, a moment, a variance, a covariance, a covariance matrix, a similarity metric, or any other statistical metric of the selected dataset. In some embodiments, extraction system 320 may be configured to generate a similarity metric representing a measure of similarity between data in a dataset. A similarity metric may be based on a correlation, covariance matrix, a variance, a frequency of overlapping values, or other measure of statistical similarity.

The extraction system 320 may be configured to generate a similarity metric based on data model output, including data model output representing a property of the data model. For example, extraction system 320 may be configured to generate a similarity metric based on activation function values, embedding layer structure and/or outputs, convolution results, entropy, loss functions, model training data, or other data model output). For example, a synthetic data model may produce first data model output based on a first dataset and a produce data model output based on a second dataset, and a similarity metric may be based on a measure of similarity between the first data model output and the second-data model output. In some embodiments, the similarity metric may be based on a correlation, a covariance, a mean, a regression result, or other similarity between a first data model output and a second data model output. Data model output may include any data model output as described herein or any other data model output (e.g., activation function values, entropy, loss functions, model training data, or other data model output). In some embodiments, the similarity metric may be based on data model output from a subset of model layers. For example, the similarity metric may be based on data model output from a model layer after model input layers or after model embedding layers. As another example, the similarity metric may be based on data model output from the last layer or layers of a model.

The extraction system 320 may be configured to classify a dataset. Classifying a dataset may include determining whether a dataset is related to another datasets. Classifying a dataset may include clustering datasets and generating information indicating whether a dataset belongs to a cluster of datasets. In some embodiments, classifying a dataset may include generating data describing the dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data may be based on a similarity metric. Edge data may and indicate a similarity between datasets and/or a hierarchical relationship (e.g., a data lineage, a parent-child relationship). In some embodiments, classifying a dataset may include generating graphical data, such as anode diagram, a tree diagram, or a vector diagram of datasets. Classifying a dataset may include estimating a likelihood that a dataset relates to another dataset, the likelihood being based on the similarity metric.

The extraction system 320 may include one or more data classification models to classify datasets based on the data schema, statistical profile, and/or edges. A data classification model may include a convolutional neural network, a random forest model, a recurrent neural network model, a support vector machine model, or another MLM. A data classification model may be configured to classify data elements as actual data, synthetic data, related data, or any other data category. In some embodiments, extraction system 320 is configured to generate and/or train a classification model to classify a dataset, consistent with disclosed embodiments.

The extraction system 320 may also contain one or more prediction models. Prediction models may include statistical algorithms that are used to determine the probability of an outcome, given a set amount of input data. For example, prediction models may include regression models that estimate the relationships among input and output variables. Prediction models may also sort elements of a dataset using one or more classifiers to determine the probability of a specific outcome. Prediction models may be parametric, non-parametric, and/or semi-parametric models.

In some examples, prediction models may cluster points of data in functional groups such as "random forests." Random Forests may comprise combinations of decision tree predictors. (Decision trees may comprise a data structure mapping observations about something, in the "branch" of the tree, to conclusions about that thing's target value, in the "leaves" of the tree.) Each tree may depend on the values of a random vector sampled independently and with the same distribution for all trees in the forest. Prediction models may also include artificial neural networks. Artificial neural networks may model input/output relationships of variables and parameters by generating a number of interconnected nodes which contain an activation function. The activation function of a node may define a resulting output of that node given an argument or a set of arguments. Artificial neural networks may generate patterns to the network via an 'input layer', which communicates to one or more "hidden layers" where the system determines regressions via a weighted connections. Prediction models may additionally or alternatively include classification and regression trees, or other types of models known to those skilled in the art. To generate prediction models, the extraction system may analyze information applying machine-learning methods.

While the extraction system 320 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the extraction system 320 may include a greater or lesser number of components than those illustrated.

FIG. 4 is a block diagram of an example system that may be used to view and interact with data aggregation system 408, according to an example implementation of the disclosed technology. The components and arrangements shown in FIG. 4 are not intended to limit the disclosed embodiments as the components used to implement the disclosed processes and features may vary. As shown, data aggregation system 408 may interact with a user device 402 and/or a third-party server 404 via a network 406. In certain example implementations, the data aggregation system 408 may include a web server 410, a local network 412, an extraction system 320, a database 416, and a plurality of entity nodes 414 (individually 414A, 414B, etc.). Each entity node may be associated with an entity and exclusively capable of selecting data sharing preferences with respect to other entities within the system 400. Each entity node may also be capable of acting as a verification node, as further discussed herein. It is to be understood that any entity node (e.g., entity node 414A) may consist of a single node or multiple nodes all affiliated with a single entity.

The user device 402 may enable a first entity node 414 to provide one or more other entity nodes 414 with access to the first entity node 414's data records. Whenever a transaction (e.g., a sharing of data from one entity to another) occurs within system 400, the entity node 414 responsible for the transaction (e.g., the sharing) may send a transaction receipt to one or more of the entity nodes 414 in order to record the transaction, where the respective entity node 414 may store the transaction on an entity database 418 (e.g., each entity node 414A corresponds to a respective entity database 418A). It is to be understood that the entity database 418 may be a single database or multiple databases associated with the corresponding entity node 414.

In some embodiments, a user may operate the user device 402. The user device 402 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 406 and ultimately communicating with one or more components of the data aggregation system 408. In some embodiments, the user device 402 may include or incorporate electronic communication devices for hearing or vision impaired users.

Users may include individuals such as, for example, subscribers, clients, prospective clients, or customers of an entity associated with an organization, such as individuals who have obtained, will obtain, or may obtain a product, service, or consultation from or conduct a transaction in relation to an entity associated with the data aggregation system 408. According to some embodiments, the user device 402 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The extraction system 320 may include programs (scripts, functions, algorithms) to configure data for visualizations and provide visualizations of datasets and data models on the user device 402. This may include programs to generate graphs and display graphs. The extraction system 320 may include programs to generate histograms, scatter plots, time series, or the like on the user device 402. The extraction system 320 may also be configured to display properties of data models and data model training results including, for example, architecture, loss functions, cross entropy, activation function values, embedding layer structure and/or outputs, convolution results, node outputs, or the like on the user device 402.

The network 406 may be of any suitable type, including individual connections via the internet such as cellular or WiFi networks. In some embodiments, the network 406 may connect terminals, services, and mobile devices using direct connections such as RFID, NFC, Bluetooth™, BLE, WiFi™, ZigBee™, ABC protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 406 may include any type of computer networking arrangement used to exchange data. For example, the network 406 may be the Internet, a private data network, virtual private network (VPN) using a public network, and/or other suitable connection(s) that enable(s) components in the system 400 environment to send and receive information between the components of the system 400. The network 406 may also include a PSTN and/or a wireless network.

The data aggregation system 408 may be associated with and optionally controlled by one or more entities such as a business, corporation, individual, partnership, or any other entity that provides one or more of goods, services, and consultations to individuals such as customers. In some embodiments, the data aggregation system 408 may be controlled by a third party on behalf of another business, corporation, individual, partnership. The data aggregation system 408 may include one or more servers and computer systems for performing one or more functions associated with products and/or services that the organization provides.

Web server 410 may include a computer system configured to generate and provide one or more websites accessible to customers, as well as any other individuals involved in access system 408's normal operations. Web server 410 may include a computer system configured to receive communications from user device 402 via for example, a mobile application, a chat program, an instant messaging program, a voice-to-text program, an SMS message, email, or any other type or format of written or electronic communication. Web server 410 may have one or more processors 422 and one or more web server databases 424, which may be any suitable repository of website data. Information stored in web server 410 may be accessed (e.g., retrieved, updated, and added to) via local network 412 and/or network 406 by one or more devices or systems of system 400. In some embodiments, web server 410 may host websites or applications that may be accessed by the user device 402. For example, web server 410 may host a financial service provider website that a user device may access by providing an attempted login that are authenticated by the extraction system 320. According to some embodiments, web server 410 may include software tools, similar to those described with respect to user device 402 above, that may allow web server 410 to obtain network identification data from user device 402. The web server may also be hosted by an online provider of website hosting, networking, cloud, or backup services, such as Microsoft Azure™ or Amazon Web Services™.

The local network 412 may include any type of computer networking arrangement used to exchange data in a localized area, such as WiFi, Bluetooth™, Ethernet, and other suitable network connections that enable components of the data aggregation system 408 to interact with one another and to connect to the network 406 for interacting with components in the system 400 environment. In some embodiments, the local network 412 may include an interface for communicating with or linking to the network 406. In other embodiments, certain components of the data aggregation system 408 may communicate via the network 406, without a separate local network 406.

The data aggregation system 408 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 402 may be able to access data aggregation system 408 using the cloud computing environment. User device 402 may be able to access data aggregation system 408 using specialized software. The cloud computing environment may eliminate the need to install specialized software on user device 402.

In accordance with certain example implementations of the disclosed technology, the data aggregation system 408 may include one or more computer systems configured to compile data from a plurality of sources the extraction system 320, web server 410, and/or the database 416. The extraction system 320 may correlate compiled data, analyze the compiled data, arrange the compiled data, generate derived data based on the compiled data, and store the compiled and derived data in a database such as the database 416. According to some embodiments, the database 416 may be a database associated with an organization and/or a related entity that stores a variety of information relating to customers, transactions, ATM, and business operations. The database 416 may also serve as a back-up storage device and may contain data and information that is also stored on, for example, database 360, as discussed with reference to FIG. 3.

Embodiments consistent with the present disclosure may include datasets. Datasets may comprise actual data reflecting real-world conditions, events, and/or measurements. However, in some embodiments, disclosed systems and methods may fully or partially involve synthetic data (e.g., anonymized actual data or fake data). Datasets may involve numeric data, text data, and/or image data. For example, datasets may include transaction data, financial data, demographic data, public data, government data, environmental data, traffic data, network data, transcripts of video data, genomic data, proteomic data, and/or other data. Datasets of the embodiments may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

Datasets of disclosed embodiments may have a respective data schema (e.g., structure), including a data type, key-value pair, label, metadata, field, relationship, view, index, package, procedure, function, trigger, sequence, synonym, link, directory, queue, or the like. Datasets of the embodiments may contain foreign keys, for example, data elements that appear in multiple datasets and may be used to cross-reference data and determine relationships between datasets. Foreign keys may be unique (e.g., a personal identifier) or shared (e.g., a postal code). Datasets of the embodiments may be "clustered," for example, a group of datasets may share common features, such as overlapping data, shared statistical properties, or the like. Clustered datasets may share hierarchical relationships (e.g., data lineage).

EXAMPLE USE CASE

The following example use case describes an example of a typical user flow pattern. This section is intended solely for explanatory purposes and not in limitation.

In one example, a first business may want to share certain financial information with a second business for purposes of obtaining an increased line of credit from the second business. For example, the first business may wish to share that it has been in business conducting active transactions for ten years, it has an 85% on-time payment record within the past three years, it has a 90% on-time payment record within the past year, and it consistently increases its new vendors with which it works. The first business may enter these sharing preferences, e.g., via a GUI of user device 402, such as in a business profile of an application owned and/or operated by data aggregation system 408. Data aggregation system 408 may be configured to retrieve metadata snapshots corresponding to the first business's financial information, such as through an ERP software or other payment system, e.g., one owned and/or operated by data aggregation system 408 or some other third party (e.g., via third-party server 404). Data aggregation system 408 may be configured to extract subsets of the metadata snapshots based on the first business's previously-entered sharing preferences associated with the second business. That is, data aggregation system 408 may be able to extract the exact pieces of financial information specified by the first business. Additionally, data aggregation system 408 may be configured to make predictions of additional portions of the retrieved metadata the first business would likely want shared with the second business based on the first business's specified sharing preferences. For example, as the first business specified it desired to share it has consistently increased the vendors with which it works, the system may predict that the first business may also desire to share the number of vendors with which the first business has worked for each of the past five years.

Data aggregation system 408 may then generate one or more blocks of a blockchain ledger, and append the extracted metadata subsets to a first block of the one or more blocks. Additionally, data aggregation system 408 may generate a cryptographic hash corresponding to the first business and the extracted metadata subsets, such that the second business can later verify the accuracy of the extracted metadata subsets.

Data aggregation system 408 may then provide the second business with access to the extracted metadata subsets via the first block by generating and storing a first unique code, and transmitting the first unique code to the second business, such as via an email message. Data aggregation system 408 may then receive a code from the second business, e.g., by the second business entering the code via a GUI of user device 402, and compare the received code to the stored first unique code to ensure the two codes match.

In some embodiments, the data aggregation system 408 may retrieve updates to the first business's financial information. Again based on the first business's previously-entered sharing preferences and/or the system's own predictions based on those preferences, data aggregation system 408 may extract additional metadata subsets from the updated data to append to a second block of the one or more generated blocks, along with a cryptographic hash corresponding to the first business and the extracted metadata subsets contained in the first block. Data aggregation system 408 may then provide the second business with access to the additional metadata subsets on the second block by either generating, storing, and transmitting to the second business a second unique code, or accepting the same code as the second business submitted in accessing the extracted metadata subsets via the first block, as discussed above.

The above-described metadata subsets associated with the first business and appended to the blockchain ledger for access by the second business, may not be modified. As such, the second business can be assured that it has an accurate and reliable financial picture of the first business for purposes of deciding whether to provide the first business with an increased line of credit.

In some examples, disclosed systems or methods may involve one or more of the following clauses:

Clause 1: A system comprising: one or more processors; and a memory in communication with the one or more processors and storing instructions that, when executed by the one or more processors, are configured to cause the system to: retrieve data corresponding to a first user; receive, from the first user, one or more first sharing preferences associated with a second user; extract one or more first data subsets from the data based on the one or more first sharing preferences; generate one or more blocks of a blockchain ledger; append the one or more first data subsets to at least a first block of the one or more blocks of the blockchain ledger; provide the second user with access to the one or more first data subsets on the at least first block; retrieve one or more updates corresponding to the data; extract one or more second data subsets from the one or more updates based on the one or more first sharing preferences; append the one or more second data subsets to at least a second block of the one or more blocks of the blockchain ledger; and provide the second user with access to the one or more second data subsets on the at least second block.

Clause 2: The system of clause 1, wherein the instructions are further configured to cause the system to: receive, from the first user, one or more second sharing preferences associated with the second user, wherein extracting the one or more second data subsets is further based on the one or more second sharing preferences.

Clause 3: The system of clause 1, wherein the data comprises one or more types of financial information associated with the first user.

Clause 4: The system of clause 3, wherein the one or more types of financial information comprise a credit limit, a credit score, payment schedules, debts, transactions, late payments, on-time payments, vendor relationships, or combinations thereof.

Clause 5: The system of clause 1, wherein the instructions are further configured to cause the system to: generate a first access code; store, in a database, the first access code; transmit the first access code to the second user; receive a second access code from the second user; and determine whether the first and second access codes match by comparing the second access code and the stored first access code, wherein providing the second user with access to the one or more first data subsets and the one or more second data subsets is responsive to determining the first and second access codes match.

Clause 6: The system of clause 5, wherein the first access code comprises a one-time code, a limited access code, or both.

Clause 7: The system of clause 1, wherein: appending the one or more first data subsets to the at least first block comprises appending the one or more first data subsets to a first location on the blockchain ledger, appending the one or more second data subsets to the at least second block comprises appending the one or more second data subsets to a second location on the blockchain ledger, and the first and second locations being different.

Clause 8: The system of clause 1, wherein the instructions are further configured to cause the system to: generate a link configured to connect the one or more first data subsets and the one or more second data subsets; append the link to the at least first block; and provide the second user with access to the link on the at least first block.

Clause 9: A system comprising: one or more processors; and a memory in communication with the one or more processors and storing instructions that, when executed by the one or more processors, are configured to cause the system to: retrieve one or more metadata snapshots corresponding to a first organization; receive, from the first organization, one or more first sharing preferences associated with a second organization; extract one or more first subsets of metadata from the one or more metadata snapshots based on the one or more first sharing preferences; generate one or more blocks of a blockchain ledger; append the one or more first subsets of metadata to at least a first block of the one or more blocks of the blockchain ledger; and provide the second organization with access to the one or more first subsets of metadata on the at least first block.

Clause 10: The system of clause 9, wherein the instructions are further configured to cause the system to: retrieve one or more updates corresponding to the one or more metadata snapshots; extract one or more second subsets of metadata from the one or more updates; append the one or more second subsets of metadata to at least a second block of the one or more blocks of the blockchain ledger; and provide the second organization with access to the one or more second subsets of metadata on the at least second block.

Clause 11: The system of clause 10, wherein the instructions are further configured to cause the system to: receive, from the first organization, one or more second sharing preferences associated with the second organization, wherein extracting the one or more second subsets of metadata is based on the one or more first sharing preferences, the one or more second sharing preferences, or both.

Clause 12: The system of clause 9, wherein the one or more metadata snapshots comprise one or more types of financial information associated with the first organization.

Clause 13: The system of clause 12, wherein the one or more types of financial information comprise a credit limit, a credit score, payment schedules, debts, transactions, late payments, on-time payments, vendor relationships, or combinations thereof.

Clause 14: The system of clause 9, wherein providing the second organization with access to the one or more first subsets of metadata comprises providing the second organization with an access code.

Clause 15: The system of clause 14, wherein the access code comprises a one-time code, a limited access code, or both.

Clause 16: A system comprising: one or more processors; and a memory in communication with the one or more processors and storing instructions that, when executed by the one or more processors, are configured to cause the system to: retrieve one or more metadata snapshots corresponding to a first organization; receive, from the first organization, one or more sharing preferences associated with a second organization; extract one or more first subsets of metadata from the one or more metadata snapshots based on the one or more sharing preferences; generate one or more blocks of a blockchain ledger; append the one or more first subsets of metadata to at least a first block of the one or more blocks of the blockchain ledger; provide the second organization with access to the one or more first subsets of metadata on the at least first block; retrieve one or more updates corresponding to the one or more first subsets of metadata; append the one or more updates to at least a second block of the one or more blocks of the blockchain ledger; and provide the second organization with access to the one or more updates on the at least second block.

Clause 17: The system of clause 16, wherein the instructions are further configured to cause the system to: generate a link configured to connect the one or more first subsets of metadata and the one or more updates; append the link to the at least first block; and provide the second organization with access to the link on the at least first block.

Clause 18: The system of clause 16, wherein the one or more metadata snapshots comprise one or more types of financial information associated with the first organization.

Clause 19: The system of clause 18, wherein the one or more types of financial information comprise a credit limit, a credit score, payment schedules, debts, transactions, late payments, on-time payments, vendor relationships, or combinations thereof.

Clause 20: The system of clause 16, wherein providing the second organization with access to the one or more first subsets of metadata and the one or more updates comprises providing the second organization with an access code, and wherein the access code comprising a one-time code, a limited access code, or both.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
one or more processors; and
a memory in communication with the one or more processors and storing instructions that, when executed by the one or more processors, are configured to cause the system to:
retrieve, via an application programming interface (API), data corresponding to a first user, the data comprising one or more first metadata snapshots corresponding to a first business purpose of the first user;
receive, from the first user, one or more first sharing preferences associated with a second user;
determine, using a machine learning model (MLM), whether the one or more first sharing preferences correspond to the retrieved data;
responsive to determining the one or more first sharing preferences do not correspond to the retrieved data, predict, via the MLM and based on at least the one or more first sharing preferences, one or more first data subsets of the data to share with the second user by associating the one or more first data subsets with the first business purpose of the first user;
extract the one or more first data subsets from the data;
generate one or more blocks of a blockchain ledger;
append the one or more first data subsets to at least a first block of the one or more blocks of the blockchain ledger;
provide the second user with access to the one or more first data subsets on the at least first block;
dynamically monitor the one or more first data subsets to detect whether any changes have been made to the one or more first data subsets;
responsive to detecting at least a first change has been made to at least one first data subset of the one or more first data subsets, provide the second user with access to the at least one first data subset by:
generating a first unique identifier corresponding to the at least one first data subset and the first change;
receiving, from the second user via a mobile application, a second unique identifier; and
determining that the first and second unique identifiers match;

retrieve one or more second metadata snapshots corresponding to the data;
determine, using the MLM, whether the one or more first sharing preferences correspond to the one or more second metadata snapshots;
responsive to determining the one or more first sharing preferences do not correspond to the one or more second metadata snapshots, predict, via the MLM and based on at least the one or more first sharing preferences, one or more second data subsets of the data to share with the second user by associating the one or more second data subsets with the first business purpose of the first user;
extract the one or more second data subsets from the one or more updates;
append the one or more second data subsets to at least a second block of the one or more blocks of the blockchain ledger;
provide the second user with access to the one or more second data subsets on the at least second block;
dynamically monitor the one or more second data subsets to detect whether any changes have been made to the one or more second data subsets; and
responsive to detecting at least a second change has been made to at least one second data subset of the one or more second data subsets, provide the second user with access to the at least one second data subset by:
generating a third unique identifier corresponding to the at least one second data subset and the second change;
receiving, from the second user via the mobile application, a fourth unique identifier; and
determining that the third and fourth unique identifiers match.

2. The system of claim 1, wherein the instructions are further configured to cause the system to:
receive, from the first user, one or more second sharing preferences associated with the second user,
wherein extracting the one or more second data subsets is further based on the one or more second sharing preferences.

3. The system of claim 1, wherein the data comprises one or more types of financial information associated with the first user.

4. The system of claim 3, wherein the one or more types of financial information comprise a credit limit, a credit score, payment schedules, debts, transactions, late payments, on-time payments, vendor relationships, or combinations thereof.

5. The system of claim 1, wherein the first and second unique identifiers comprise a one-time code, a limited access code, or both.

6. The system of claim 1, wherein:
appending the one or more first data subsets to the at least first block comprises appending the one or more first data subsets to a first location on the blockchain ledger,
appending the one or more second data subsets to the at least second block comprises appending the one or more second data subsets to a second location on the blockchain ledger, and
the first and second locations being different.

7. The system of claim 1, wherein the instructions are further configured to cause the system to:
generate a link configured to connect the one or more first data subsets and the one or more second data subsets;
append the link to the at least first block; and
provide the second user with access to the link on the at least first block.

8. The system of claim 1, wherein the instructions are further configured to cause the system to:
generate a first cryptographic hash associated with the first user and the one or more first data subsets; and
append the first cryptographic hash to the second block.

9. The system of claim 1, wherein the MLM comprises a data classification model comprising one or more of a convolutional neural network, a random forest model, a recurrent neural network model, a support vector machine model, or combinations thereof.

10. The system of claim 1, wherein the MLM is trained to classify data elements as one or more of actual data, synthetic data, related data, a data category, or combinations thereof.

11. A system comprising:
one or more processors; and
a memory in communication with the one or more processors and storing instructions that, when executed by the one or more processors, are configured to cause the system to:
retrieve, via an application programming interface (API), one or more metadata snapshots corresponding to a first business purpose of a first organization;
receive, from the first organization, one or more first sharing preferences associated with a second organization;
determine, using a machine learning model (MLM), whether the one or more first sharing preferences correspond to the one or more metadata snapshots;
responsive to determining the one or more first sharing preferences do not correspond to the one or more metadata snapshots, predict, via the MLM and based on at least the one or more first sharing preferences, one or more first subsets of metadata snapshots of the one or more metadata snapshots to share with the second organization by associating the one or more first subsets with the first business purpose of the first organization;
extract the one or more first subsets of metadata snapshots from the one or more metadata snapshots;
generate one or more blocks of a blockchain ledger;
append the one or more first subsets of metadata to at least a first block of the one or more blocks of the blockchain ledger;
provide the second organization with access to the one or more first subsets of metadata on the at least first block;
dynamically monitor the one or more first subsets of metadata to detect whether any changes have been made to the one or more first subsets of metadata; and
responsive to detecting at least a first change has been made to at least one first subset of the one or more first subsets of metadata, provide the second organization with access to the at least one first subset by:
generating a first unique identifier corresponding to the at least one first subset and the first change;
receiving, from the second organization, a second unique identifier; and
determining that the first and second unique identifiers match.

12. The system of claim 11, wherein the instructions are further configured to cause the system to:
retrieve one or more updates corresponding to the one or more metadata snapshots;

extract one or more second subsets of metadata from the one or more updates;

append the one or more second subsets of metadata to at least a second block of the one or more blocks of the blockchain ledger; and provide the second organization with access to the one or more second subsets of metadata on the at least second block.

13. The system of claim 12, wherein the instructions are further configured to cause the system to:

receive, from the first organization, one or more second sharing preferences associated with the second organization, wherein extracting the one or more second subsets of metadata is based on the one or more first sharing preferences, the one or more second sharing preferences, or both.

14. The system of claim 11, wherein providing the second organization with access to the one or more first subsets of metadata comprises providing the second organization with an access code.

15. The system of claim 14, wherein the access code comprises a one-time code, a limited access code, or both.

16. A system comprising:

one or more processors; and a memory in communication with the one or more processors and storing instructions that, when executed by the one or more processors, are configured to cause the system to:

retrieve, via an application programming interface (API), one or more metadata snapshots corresponding to a first business purpose of a first organization;

receive, from the first organization, one or more sharing preferences associated with a second organization;

determine, using a machine learning model (MLM), whether the one or more sharing preferences correspond to the one or more metadata snapshots;

responsive to determining the one or more sharing preferences do not correspond to the one or more metadata snapshots, predict, via the MLM and based on at least the one or more sharing preferences, one or more first subsets of metadata snapshots of the one or more metadata snapshots to share with the second organization by associating the one or more first subsets with the first business purpose of the first organization;

extract the one or more first subsets of metadata snapshots from the one or more metadata snapshots;

generate one or more blocks of a blockchain ledger;

append the one or more first subsets of metadata to at least a first block of the one or more blocks of the blockchain ledger;

provide the second organization with access to the one or more first subsets of metadata on the at least first block;

retrieve one or more second metadata snapshots corresponding to the one or more first subsets of metadata snapshots;

append the one or more second metadata snapshots to at least a second block of the one or more blocks of the blockchain ledger;

provide the second organization with access to the one or more second metadata snapshots on the at least second block;

dynamically monitor the one or more second metadata snapshots to detect whether any changes have been made to the one or more second metadata snapshots; and responsive to detecting at least a first change has been made to at least one first metadata snapshot of the one or more second metadata snapshots, provide the second organization with access to the at least one first metadata snapshot by:

generating a first unique identifier corresponding to the at least one first metadata snapshot and the first change;

receiving, from the second organization, a second unique identifier; and determining that the first and second unique identifiers match.

17. The system of claim 16, wherein the instructions are further configured to cause the system to:

generate a link configured to connect the one or more first subsets of metadata and the one or more updates;

append the link to the at least first block; and provide the second organization with access to the link on the at least first block.

18. The system of claim 16, wherein the one or more metadata snapshots comprise one or more types of financial information associated with the first organization.

19. The system of claim 18, wherein the one or more types of financial information comprise a credit limit, a credit score, payment schedules, debts, transactions, late payments, on-time payments, vendor relationships, or combinations thereof.

20. The system of claim 16, wherein providing the second organization with access to the one or more first subsets of metadata and the one or more updates comprises providing the second organization with an access code, and wherein the access code comprising a one-time code, a limited access code, or both.

* * * * *